(12) United States Patent
Kang et al.

(10) Patent No.: US 10,180,757 B2
(45) Date of Patent: Jan. 15, 2019

(54) IN-CELL TOUCH TYPE DISPLAY DEVICE TO REDUCE CAPACITIVE LOAD AND DRIVING IC THEREOF

(71) Applicant: LG DISPLAY CO., LTD., Seoul (KR)

(72) Inventors: Ji-Won Kang, Gyeryong-si (KR); Ki-Taeg Shin, Daegu (KR); Dong-Geun Lim, Namwon-si (KR); Chel-Hee Jo, Daejeon (KR)

(73) Assignee: LG DISPLAY CO., LTD., Seoul (KR)

( * ) Notice: Subject to any disclaimer, the term of this patent is extended or adjusted under 35 U.S.C. 154(b) by 86 days.

(21) Appl. No.: 15/218,932

(22) Filed: Jul. 25, 2016

(65) Prior Publication Data

US 2017/0031520 A1 Feb. 2, 2017

(30) Foreign Application Priority Data

Jul. 30, 2015 (KR) ........................ 10-2015-0108129

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01)

(58) Field of Classification Search
CPC ....... G06F 3/0412; G06F 3/0418; G06F 3/044
See application file for complete search history.

(56) References Cited

U.S. PATENT DOCUMENTS

2010/0253638 A1* 10/2010 Yousefpor ............. G06F 3/0412
345/173

FOREIGN PATENT DOCUMENTS

CN 102439548 A 5/2012
WO 2010117885 A2 10/2010

* cited by examiner

*Primary Examiner* — Ram A Mistry
(74) *Attorney, Agent, or Firm* — Dentons US LLP (57) ABSTRACT

An in-cell touch type display device includes a touch electrode that is in a touch panel and arranged at each touch block; a sensing line that is connected to the touch electrode, and transfers a touch driving signal from a source driving circuit during a touch sensing period; a gate-in panel (GIP) circuit that is in an array substrate, and outputs a gate signal to a gate line crossing and overlapping the sensing line, during a display period; and a load reduction circuit that outputs the touch driving signal to the gate line during the touch sensing period.

12 Claims, 11 Drawing Sheets

IN-CELL TOUCH TYPE DISPLAY DEVICE TO REDUCE CAPACITIVE LOAD AND DRIVING IC THEREOF

CROSS REFERENCE TO RELATED APPLICATIONS

The present application claims the priority benefit of Korean Patent Application No. 10-2015-0108129 filed in Republic of Korea on Jul. 30, 2015, which is hereby incorporated by reference in its entirety for all purposes as if fully set forth herein.

BACKGROUND

Field of the Invention

The present invention relates to an in-cell touch type display device, and more particularly, to an in-cell touch type display device with improved touch performance.

Discussion of the Related Art

Facing information society, display field of displaying electric information signals has been rapidly advanced, and accordingly, various flat display devices have been developed and used. As flat display devices, a liquid crystal display device (LCD), a plasma display panel device (PDP), an organic light emitting diode (OLED) display device and the like are used.

Among the flat display devices, LCDs are widely used because they have advantages of small size, light weight, thin profile, low power consumption, and the like.

Recently, an LCD having a gate-in panel (GIP) structure in which a gate driving circuit is directly formed in an array substrate of a liquid crystal panel is widely used.

Further, a touch function has been added to an LCD. Particularly, to achieve thin profile, an in-cell touch type LCD, in which a touch screen is embedded, is used.

In the in-cell touch type LCD, touch blocks arranged in a matrix form in a display region are defined, self-capacitance type touch electrodes are arranged corresponding to respective touch blocks, and sensing lines are connected to respective touch electrodes. In this configured LCD, a display period and a touch sensing period alternate, and during the touch sensing period, a touch driving signal for a touch sensing is outputted to each touch sensing line and is applied to the corresponding touch electrode.

In such a in-cell touch type LCD according to the related art, since the sensing line overlaps a signal line such as a gate line or data line, a coupling capacitance is produced and a capacitive load is produced.

Because of this capacitive load, an RC (resistance-capacitance) delay is caused. Accordingly, a touch sensitivity is reduced, and a touch performance is reduced.

Figure 1:
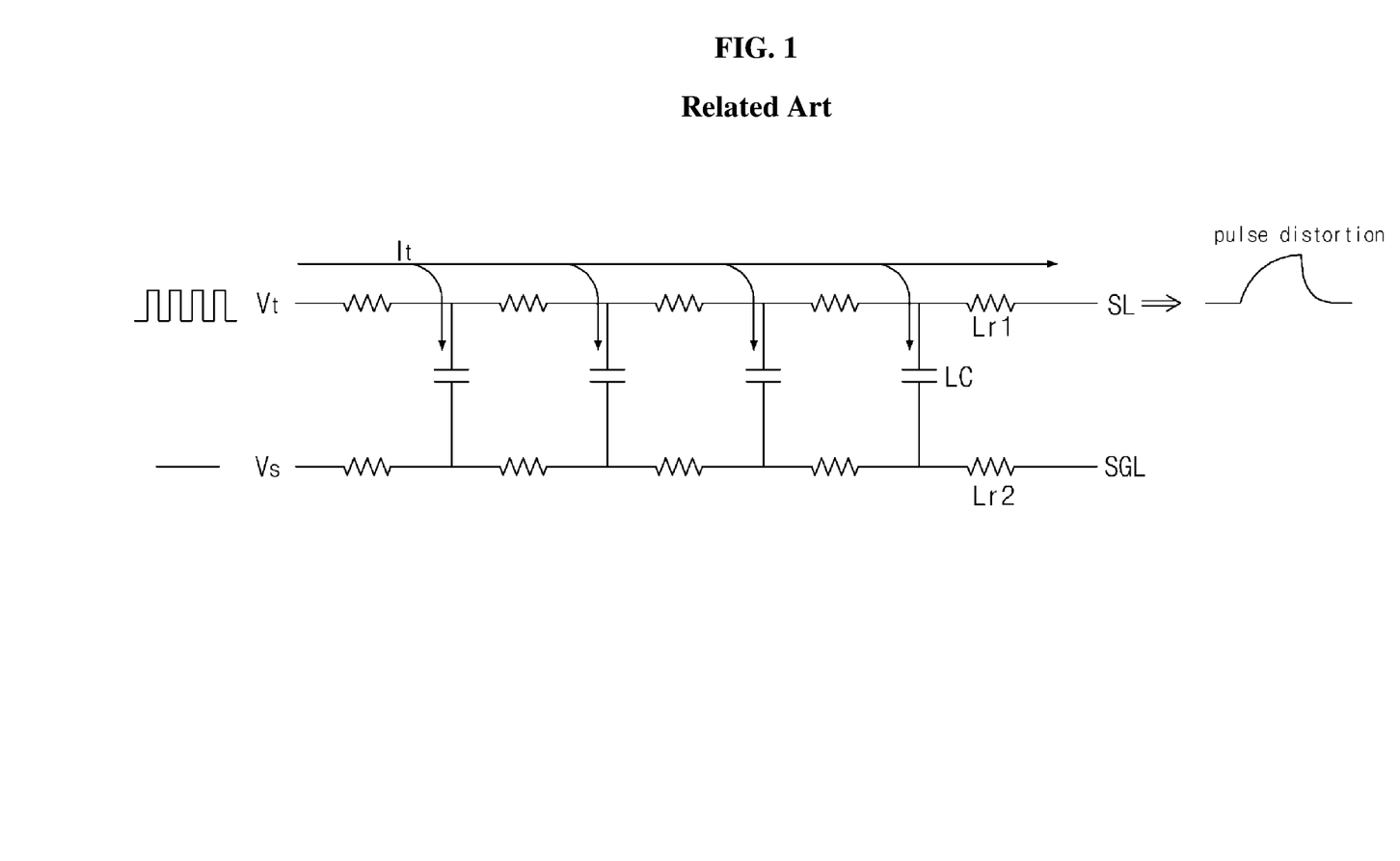
FIG. 1 is an equivalent circuit diagram of an in-cell touch type LCD according to the related art.

FIG. 1 is an equivalent circuit diagram of an in-cell touch type LCD according to the related art.

Referring to FIG. 1, resistive loads Lr1 and Lr2 generally exist at a sensing line SL and a signal line SGL, respectively, and a capacitive load Lc exists between the sensing line SL and the signal line SGL. In a touch sensing period, a touch driving signal Vt in a pulse waveform is applied to the sensing line SL, a low voltage Vs in a DC form is continuously applied.

Accordingly, a voltage difference as shown in the waveform of the touch driving signal Vt is produced between both ends of the capacitive load Lc, and thus a signal current It flowing on the sensing line SL inflows into the capacitive load Lc. Thus, the touch driving signal Vt has an RC delay and a pulse waveform is distorted, and thus a touch performance may be reduced.

This problem happens with various types of display devices, including an OLED display device, that use an in-cell touch configuration.

SUMMARY

Accordingly, the present invention is directed to an in-cell touch type display device and a method of manufacturing the same that substantially obviate one or more of the problems due to limitations and disadvantages of the related art.

An advantage of the present invention is to provide an in-cell touch type display device with improved touch performance.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, an in-cell touch type display device includes a touch electrode that is in a touch panel and arranged at each touch block; a sensing line that is connected to the touch electrode, and transfers a touch driving signal from a source driving circuit during a touch sensing period; a gate-in panel (GIP) circuit that is in an array substrate, and outputs a gate signal to a gate line crossing and overlapping the sensing line, during a display period; and a load reduction circuit that outputs the touch driving signal to the gate line during the touch sensing period.

In another aspect, a driving IC of an in-cell touch type display device includes an output terminal that outputs a touch driving signal to a sensing line, which is connected to a touch electrode arranged at each touch block, during a touch sensing period; an output terminal that outputs a switching signal, which has an off state and an on state during a display period and the touch sensing period, respectively, to a first transfer line connected to a gate terminal of a transistor, the transistor connected to a gate line crossing and overlapping the sensing line; and an output terminal that outputs the touch driving signal to a second transfer line connected to a source terminal of the transistor during the touch sensing period.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to exemplary embodiments, examples of which are illustrated in the accompanying drawings. The same reference numbers may be used throughout the drawings to refer to the same or like parts.

For the purpose of explanations, embodiments of the present invention are described with an LCD as a display device by way of example.

Figure 2:
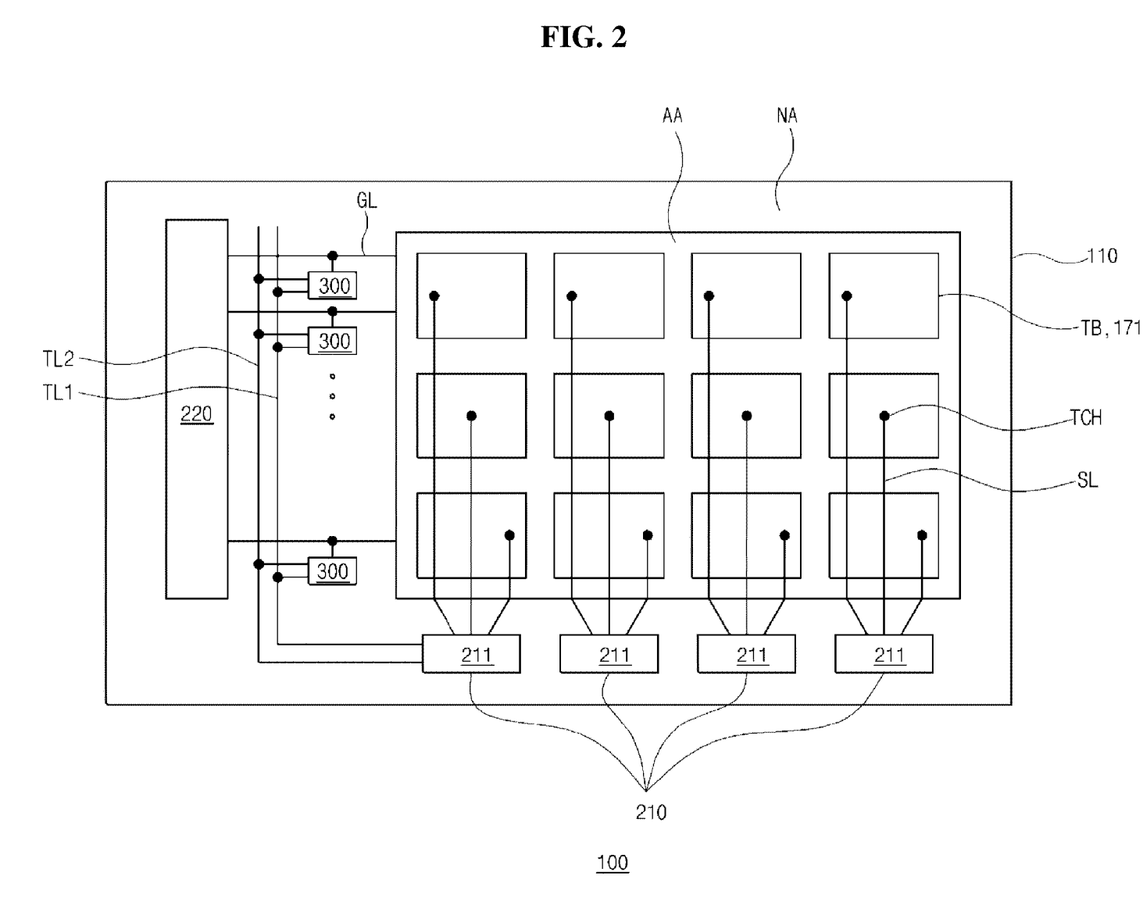
FIG. 2 is a view illustrating an in-cell touch type LCD having a GIP structure according to a first embodiment of the present invention.

FIG. 2 is a view illustrating an in-cell touch type LCD having a GIP structure according to a first embodiment of the present invention.

Referring to FIG. 2, the LCD 100 of this embodiment includes a liquid crystal panel 110 as a display panel to display images, and a panel driving circuit to drive the liquid crystal panel 110. The LCD 100 may further include a load reduction circuit 300 to reduce an influence of a capacitive load with a gate line.

The liquid crystal panel 110 is an in-cell touch type liquid crystal panel in which a touch electrode 171 as a self-capacitive type touch element is configured. The liquid crystal panel 110 includes an array substrate, an opposing substrate, for example, a color filter substrate facing the array substrate, and a liquid crystal layer between the array substrate and the color filter substrate.

The touch electrode 171 may be configured to function as a common electrode, and in this case, the touch electrode 171 i.e., the common electrode 171 may be formed in the array substrate along with a pixel electrode to operate the liquid crystal layer during a display period to display images. The liquid crystal panel 110 including the touch electrode 171 may be, for example, an in-plane switching (IPS) mode or advanced high performance in-plane switching (AH-IPS) mode liquid crystal panel. In this embodiment, for the purpose of explanations, the AH-IPS mode liquid crystal panel 110 to produce a fringe electric field is described.

The liquid crystal panel 110 includes a display region AA and a non-display region NA surrounding the display region AA. In the display region AA, pixel regions are arranged in a matrix form along rows and columns.

In the liquid crystal panel 110, a plurality of touch blocks TB may be arranged in a matrix form along rows and columns. Each touch block TB may be configured with a plurality of pixel regions neighboring one another along column and row directions as a group unit for each touch block TB.

In the array substrate of the liquid crystal panel 110, the touch electrode 171 is formed with the touch block TB as a unit. Each touch electrode 171 formed at each touch block TB is patterned to be separated from and spaced apart from a touch block 171 of a neighboring touch block TB. In other words, touch electrodes 171 of touch blocks neighboring each other are electrically disconnected from each other.

In the array substrate of the liquid crystal panel 110, each sensing line SL connected to each touch block TB extends along a direction. For example, the sensing line SL extends along a column direction which is an extension direction of the data line. The sensing line SL is connected to the touch electrode 171 of the corresponding touch block TB through a corresponding touch contact hole TCH and transfers a driving signal to the touch electrode 171.

In this regard, during each frame as a display period, a common voltage is supplied to the sensing line SL and is transferred to the touch electrode 171. Accordingly, in each pixel region, an electric field between the pixel electrode and the touch electrode 171 is produced to operate a liquid crystal, and thus images are displayed.

During a touch sensing period between neighboring display periods (i.e., during a blank period between neighboring frames), a touch driving signal of a pulse waveform is supplied to the sensing line SL and is transferred to the touch electrode 171. Further, a sensing signal, which corresponds to a change amount of a capacitance of each tough block TB according to a touch, is detected through the touch electrode 171 and is supplied to the sensing line SL. A user's touch is determined by the detected sensing signal.

As such, the touch electrode 171 formed at the touch block TB functions as the common electrode 171 to produce an electric field and the electrode to sense the user's touch. Thus, the thin in-cell touch type liquid crystal panel 100 can be realized.

Figure 3:
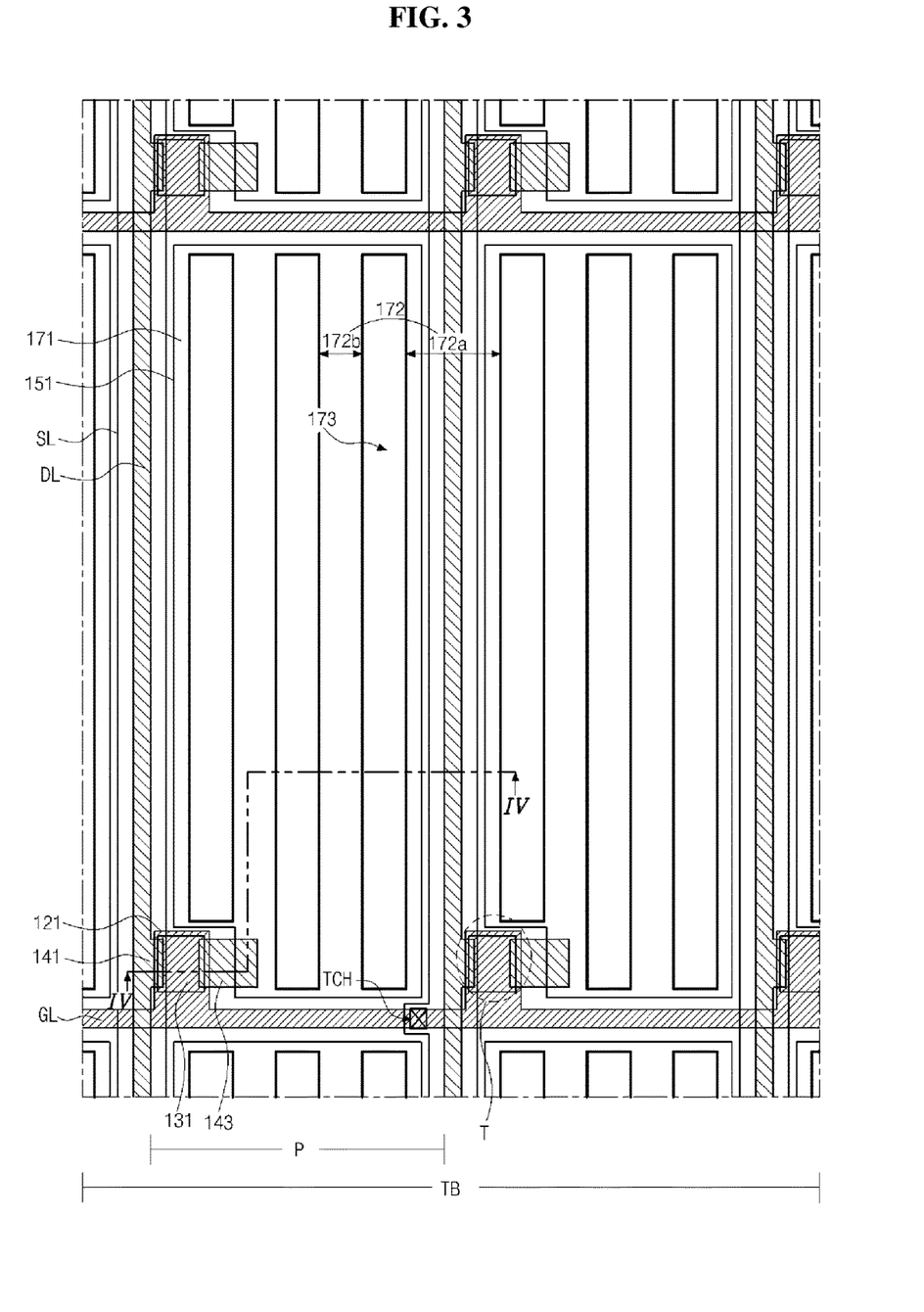
FIG. 3 is a plan view illustrating a portion of an inside region of a touch block of a liquid crystal panel according to the first embodiment of the present invention.
Figure 4:
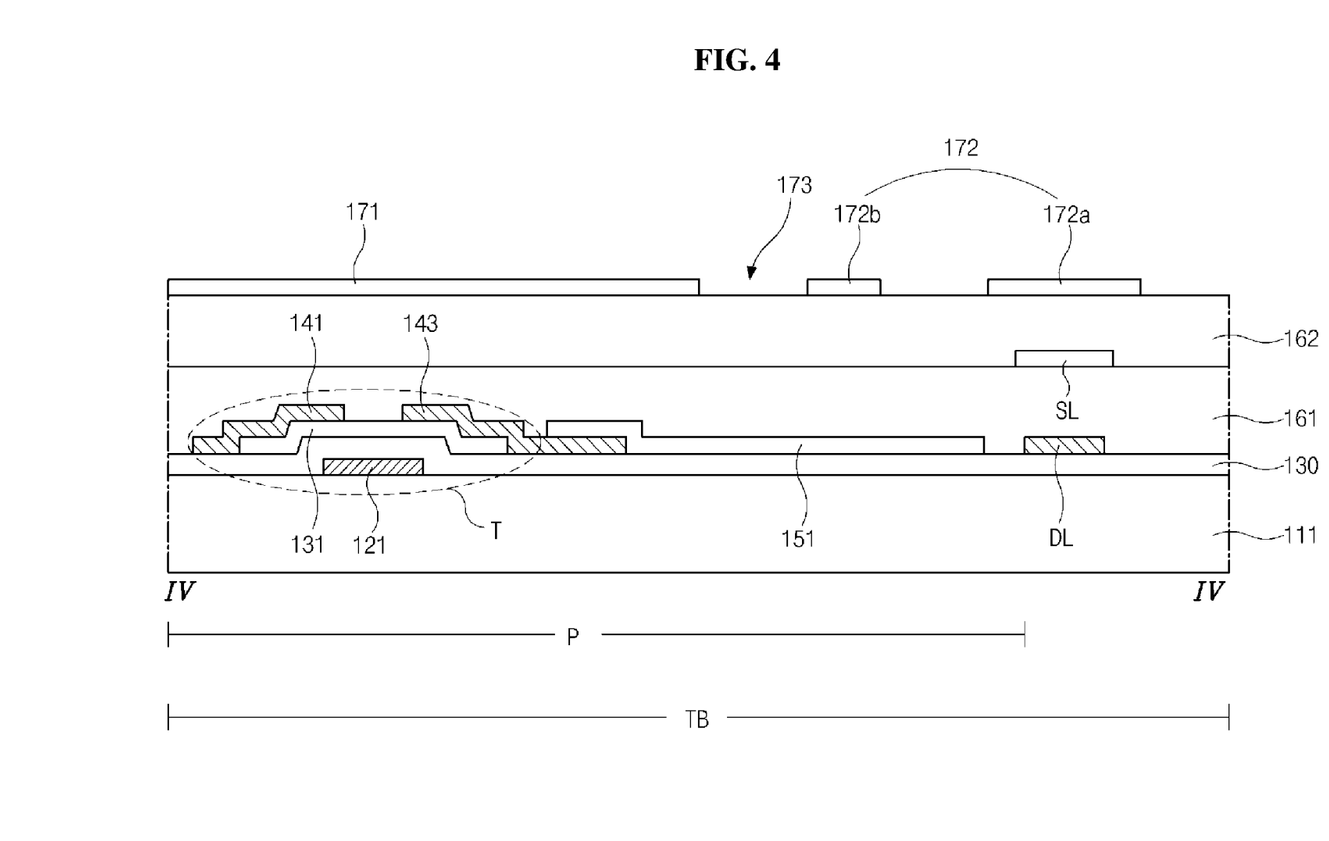
FIG. 4 is a cross-sectional view taken along line IV-IV of FIG. 3.

A structure of the liquid crystal panel 110 is explained with further reference to FIGS. 3 and 4.

FIG. 3 is a plan view illustrating a portion of an inside region of a touch block of a liquid crystal panel according to the first embodiment of the present invention, and FIG. 4 is a cross-sectional view taken along a line IV-IV of FIG. 3.

Referring to FIGS. 3 and 4, at the array substrate of the liquid crystal panel 110, a plurality of gate lines GL extend along a first direction, for example, a row direction on a substrate 111. A gate insulating layer 130 is formed on the gate lines GL. A plurality of data lines DL are formed on the gate insulating layer 130 and extend along a second direction, for example, a column direction.

By the gate lines GL and the data lines DL crossing each other, a plurality of pixel regions P arranged in a matrix form are defined.

In each pixel region P, a thin film transistor T connected to the corresponding gate and data lines GL and DL is formed.

The thin film transistor T includes a gate electrode 121 connected to the gate line GL, a semiconductor layer 131 on the gate insulating layer 130 over the gate electrode 121, and source and drain electrodes 141 and 143 on the semiconductor layer 131 and spaced apart from each other. The source electrode 141 is connected to the data line DL.

In each pixel region P, a pixel electrode 151 connected to the drain electrode 143 is formed.

Each touch electrode 171 i.e., each common electrode 171 is formed at each touch block TB. The common electrode 171 may be arranged over the pixel electrode 151 with at least one insulating layer, for example, first and second passivation layers 161 and 162 therebetween, and produces a fringe electric field with the pixel electrode 151. The common electrode 171 may include a plurality of electrode patterns 172, of a bar shape, that correspond to each pixel region P and face each pixel electrode 171, and an opening 173 may be formed between neighboring electrode patterns 172.

In this case, the electrode patterns 172 may extend along the extension direction of the data line DL. The electrode patterns 172 may include a first electrode pattern 172a that is closer to the data line DL and located at an outermost portion of the pixel region P, and a second electrode pattern 172b that is located at an inner portion of the pixel region P.

The first electrode pattern 172a may be formed, but not limited, with a width greater than the data line DL to shield the data line DL therebelow. Further, the first electrode pattern 172a may be formed, but not limited, with a width greater than the sensing line SL overlapping the data line DL to substantially shield the sensing line therebelow.

When the first electrode pattern 172a is formed above, an electrical interference between the data line DL and the sensing line SL, and the pixel electrode 151 can be prevented.

The second electrode pattern 172b may be formed, but not limited, with a width less than the first electrode pattern 172a.

In another example regarding arrangement of the common electrode 171 and the pixel electrode 151, a common electrode 171 at each touch block TB may be formed to have a substantially plate shape, and a pixel electrode 151 may be located over this common electrode 171 with an insulating layer therebetween.

In yet another example, each of a common electrode 171 and a pixel electrode 151 may be formed to have electrode patterns, and these common electrode 171 and pixel electrode 151 may be located at the same layer or with an insulating layer therebetween.

In the array substrate of the liquid crystal panel 110, each sensing line SL connected to each touch block TB to transfer a driving signal is formed. The sensing line SL may extend along the extension direction of the data line DL and overlap the data line DL, in the corresponding touch block TB. When the sensing line SL is arranged to overlap the data line DL as a non-display element, reduction of an aperture ratio due to the sensing line SL can be prevented, and also the sensing line SL can be maximized in width and be reduced in resistance. The sensing line SL and the data line DL may be arranged with at least one insulating layer, for example, the first passivation layer 161 therebetween.

The sensing line SL and the common line 171 may be arranged with an insulating layer, for example, the second passivation layer 162 therebetween, and may contact each other through a contact hole TCH formed in the insulating layer.

In the above-configured liquid crystal panel 110, since the sensing line SL overlaps signal lines, such as the gate line GL transferring a gate signal and the data line DL transferring a data signal, a coupling capacitance between the sensing line SL and the signal lines GL and DL is produced.

Referring to FIG. 2, the panel driving circuit generates sorts of signals and supplies the signals to the liquid crystal panel 110 to operate the liquid crystal panel 110. The panel driving circuit may be configured to produce driving signals to drive the liquid crystal panel 110 according to control signals transferred from a driving board outside the liquid crystal panel 110.

The panel driving circuit may include a source driving circuit 210 and a gate driving circuit 220.

The source driving circuit 210 may be connected to the data lines DL and the sensing lines SL and be operated to output related driving signals through output terminals coupled to the respective lines DL and SL. Further, the source driving circuit 210 may be connected to transfer lines TL1 and TL2 connected to each load reduction circuit 300 and be operated to output related driving signals through output terminals coupled to the respective lines TL1 and TL2.

The source driving circuit 210 may be configured with a IC type that a data driving circuit and a touch sensing circuit are integrated. In this embodiment, for the purpose of explanations, is described the source driving circuit 210 that includes a plurality of source ICs 211 which are arranged corresponding to each touch-block column. The source IC 211 may be, for example, mounted on the non-display region NA at one side of the data line DL and the sensing line SL in a COG (chip on glass) manner.

The source driving circuit 210 outputs a common voltage to each sensing line SL during a display period, and outputs a touch driving signal to each sensing line SL during a touch sensing period. Further, the source driving circuit 210 may be supplied with a sensing signal, which is generated at the touch electrode 171 during the touch sensing period, through the sensing line SL.

Further, the source driving circuit 210 outputs a data signal to each data line DL during the display period. Further, during the touch sensing period, the source driving circuit 210 may output the touch driving signal to the data line DL identically to the sensing line SL.

As such, when the touch driving signal is outputted to the data line DL during the touch sensing period, an influence of a capacitance load between the data line DL and the sensing line SL can be reduced or minimized. In other words, since the same waveform signals are applied at the same timing to both end electrodes of a coupling capacitor between the data line DL and the sensing line SL, a voltage difference between the both end electrodes of the coupling capacitor may not happen substantially. Accordingly, a signal current transferred through the sensing line SL can be prevented from inflowing into the coupling capacitor, and thus a capacitive load can be minimized. Thus, an RC delay of the touch driving signal due to the capacitive load with the data line DL can be minimized.

The gate driving circuit 220 may be a shift register circuit, and sequentially outputs gate signals to the gate lines GL. The gate driving circuit 220 is formed with a GIP structure. In other words, in processes of manufacturing the array substrate, the gate driving circuit 220 is formed directly at the non-display region NA at one side of the gate line GL. The gate driving circuit 220 may include a plurality of GIP circuits that are connected to respective gate lines GL and output respective gate signals.

In this embodiment, is described the gate driving circuit 220 of the GIP structure that is located at one side of the display region AA. In another example, gate driving circuits 220 of the GIP structure may be arranged at both sides of the display region AA, respectively. in the case of being arranged at the both sides of the display region AA, one of the gate driving circuits 220 may be connected to odd-numbered gate lines and the other one of the gate driving circuits 220 may be connected to even-numbered gate lines.

The load reduction circuits 300 may be connected to respective signal output terminals of the gate driving circuit 220. In other words, each load reduction circuit 300 may be connected in parallel to the gate driving circuit 220 at an end of each gate line GL which is connected to each output terminal of the gate driving circuit 220.

The load reduction circuit 300 is configured such that: during the display period, the load reduction circuit 300 is in a disabled state i.e., an off state, and a signal output to the corresponding gate line GL is off; and during the touch sensing period, the load reduction circuit 300 is in a enabled state i.e., an on state, and a signal output to the corresponding gate line GL is on, thus the load reduction circuit 300 outputs a touch driving signal to the corresponding gate line GL.

Accordingly, being equal to outputting a touch driving signal to the data line DL as described above, a capacitive load between the gate line GL and the sensing line SL can be reduced or minimized. In other words, since the same waveform signals are applied at the same timing to both end electrodes of a coupling capacitor between the gate line GL and the sensing line SL, a voltage difference between the both end electrodes of the coupling capacitor may not happen substantially. Accordingly, a signal current transferred through the sensing line SL can be prevented from inflowing into the coupling capacitor, and thus a capacitive load can be minimized. Thus, an RC delay of the touch driving signal due to the capacitive load with the gate line DL can be minimized.

Figure 5:
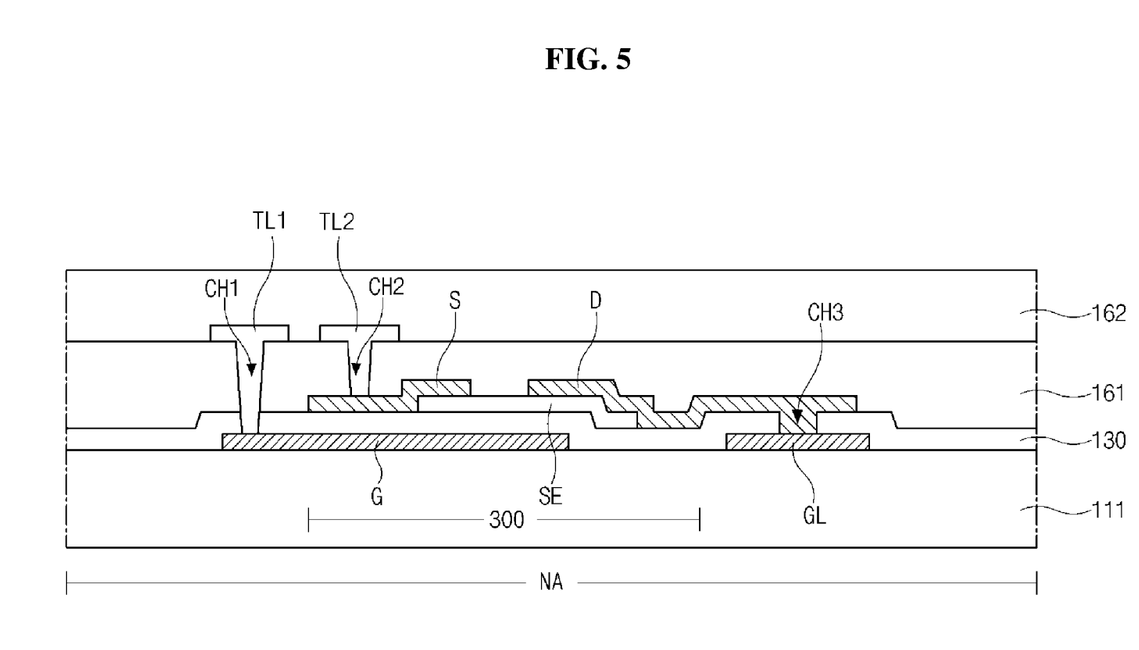
FIG. 5 is a cross-sectional view illustrating a structure of a load reduction circuit according to the first embodiment of the present invention.
Figure 6:
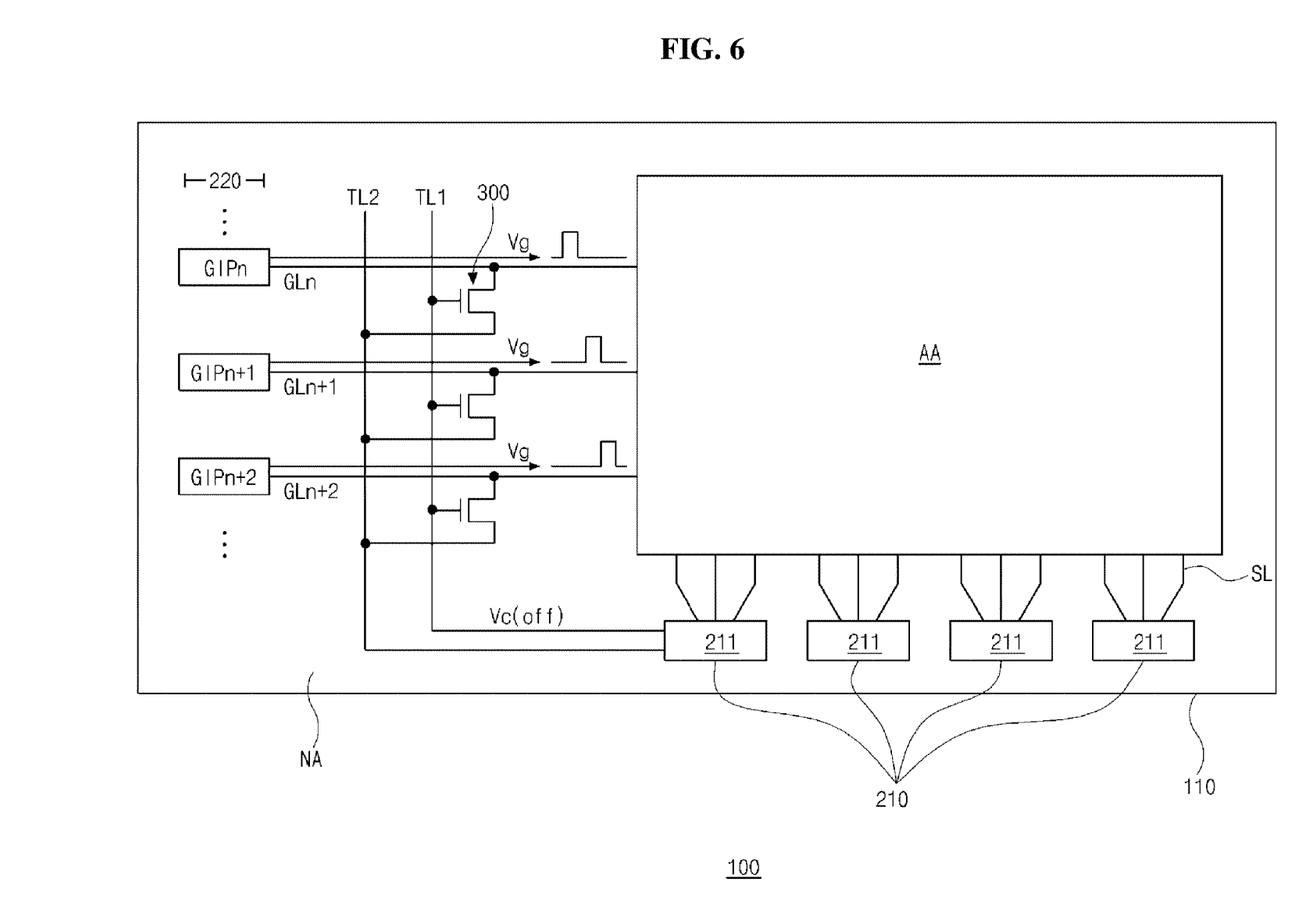
FIGS. 6 and 7 are views illustrating signal output operations of a gate driving circuit and a load reduction circuit 300 in a display period and a touch sensing period, respectively, according to the first embodiment of the present invention.
Figure 7:
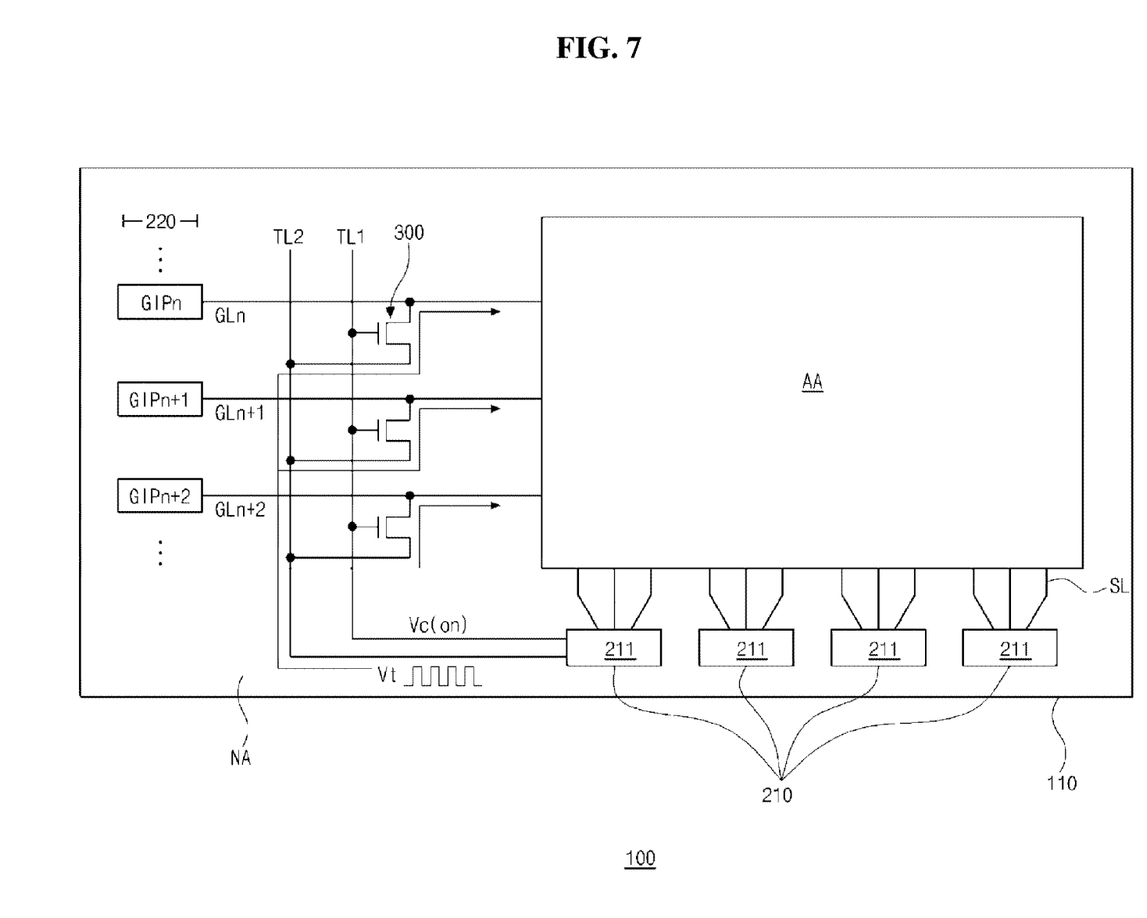

A structure of the load reduction circuit 300, and signal output operations of the gate driving circuit 200 and the load reduction circuit 300 are explained with further reference to FIGS. 5 to 7.

FIG. 5 is a cross-sectional view illustrating a structure of a load reduction circuit according to the first embodiment of the present invention, and FIGS. 6 and 7 are views illustrating signal output operations of a gate driving circuit and a load reduction circuit 300 in a display period and a touch sensing period, respectively, according to the first embodiment of the present invention. For the purpose of explanations, some GIP circuits of the gate driving circuit are shown in FIGS. 6 and 7.

Referring to FIGS. 5 to 7, the gate driving circuit 220 includes a plurality of GIP circuits (GIP; GIPn to GIPn+2) connected to respective gate lines GL and output gate signals Vg. The GIP circuits GIP sequentially output the gate signals Vg to the corresponding gate lines GL.

Each GIP circuit GIP may be configured to include a plurality of transistors and to influence a GIP circuit located at a previous state and a GIP circuit at a next stage. For example, regarding a (n+1)th GIP circuit GIPn+1, a gate signal Vg outputted from a GIP circuit GIPn located at a previous stage may be used as a start signal for the (n+1)th GIP circuit GIPn+1, and a gate signal Vg outputted from a GIP circuit GIPn+2 located at a next stage may be used as a reset signal for the (n+1)th GIP circuit GIPn+1.

As such, the GIP circuits GIP are designed to achieve an driving scheme of sequentially outputting the gate signals Vg to the gate lines GL during the display period.

The load reduction circuit 300 may be formed, for example, at the non-display region NA between the gate driving circuit 220 and the display region AA. The signal output terminal of the load reduction circuit 300 is connected to the signal output terminal of the corresponding GIP circuit GIP.

The load reduction circuit 300 may be configured, for example, with a transistor. In this case, a drain terminal D, a source terminal S, and a gate terminal G of the transistor of the load reduction circuit 300 is a signal output terminal, a signal input terminal, and an output control terminal.

Between the gate driving circuit 220 and the display region AA, the first transfer line TL1 and the second transfer line TL2, which are connected to the load reduction circuit 300 and transfer a switching signal Vc and a touch driving signal Vt, respectively, are formed extending along a length direction of the gate driving circuit 220. Each of the first and second transfer lines TL1 and TL2 may be connected in common with all load reduction circuits 300.

One ends of the first and second transfer lines TL1 and TL2 are connected to the source driving circuit 210, for example, the source IC 211 closest to the gate driving circuit 220, and receives the switching signal Vc and the touch driving signal Vt, respectively.

The structures of the load reduction circuit 300 and the transfer lines TL1 and TL2 are explained in more detail with reference to FIG. 5. In processes of manufacturing the array substrate, for example, in forming the thin film transistor (T of FIG. 4) of the pixel region, the load reduction circuit 300 may be formed directly on the non-display region NA of the substrate 111. In other words, the gate terminal G of the load reduction circuit 300 i.e., the transistor 300 is formed on the substrate 111, the gate insulating layer 130 is formed on the gate terminal G, the semiconductor layer SE is formed on the gate insulating layer 130, and the source and drain terminals S and G spaced apart from each other are formed on the semiconductor layer SE.

The first and second transfer lines TL1 and TL2 may be formed directly on the non-display region NA of the substrate 111 in the processes of manufacturing the array substrate, for example, in forming the gate line GL, the data line (DL of FIG. 4), the sensing line SL, the pixel electrode (151 of FIG. 4), the touch electrode (171 of FIG. 4), and the like. In this embodiment, is described an example of forming the first and second transfer lines TL1 and TL2 at the same process of forming the sensing line SL. In this case, the first transfer line TL1 may be connected to the gate terminal G of the transistor 300 through a first contact hole CH1, and the second transfer line TL2 may be connected to the source terminal S of the transistor 300 through a second contact hole CH2. The drain terminal D of the transistor 300 may be connected to the gate line GL through a third contact hole CH3.

As shown in FIG. 6, during the display period, the gate driving circuit 220 is in an enabled state and sequentially outputs the gate signals Vg to the gate lines GL.

During the display period, the load reduction circuit 300 is in a disabled state and a signal output therefrom is off. To do this, the switching signal Vc of a off state is transferred to the first transfer line TL1, and thus the load reduction circuit 300 is turned off and a signal output therefrom is off.

Then, as shown in FIG. 7, during the touch sensing period, the gate driving circuit 220 is in a disabled state and a gate signal output therefrom is off.

During the touch sensing period, the load reduction circuit 300 is in an enabled state and a touch driving signal output therefrom is on. To do this, the switching signal Vc of an on state is transferred to the first transfer line TL1, and thus the load reduction circuit 300 is turned on. In sync with the turn-on of the load reduction circuit 300, the touch driving signal Vt is transferred to the load reduction circuit 300 through the second transfer line TL2 and is outputted to each gate line GL.

As described above, in this embodiment, in sync with the display period or the touch sensing period, the gate driving circuit 220 or the load reduction circuit 300 is selected and the gate signal or the touch driving signal is selectively outputted.

Accordingly, during the display period, the GIP-structure gate driving circuit 220 is selected so that the gate signals Vg to display images can be outputted to the gate lines GL, and during the touch sensing period, the load reduction circuit 300 is selected so that the touch driving signals Vt to reduce a capacitive load with the sensing line SL can be outputted to the gate lines GL.

Particularly, as explained above, the GIP-structure gate driving circuit 220 is designed to achieve an driving scheme that the GIP circuits GIP at previous and next stages interact each other to sequentially outputting the gate signals Vg, and this-designed GIP circuits GIP may not be operated to simultaneously output the same touch driving signal Vt to all gate lines GL during the touch sensing period. Thus, in this embodiment, the load reduction circuit 300 is employed, and operated during the touch sensing period to output the touch driving signal Vt to the gate line GL. Accordingly, during the display period, the gate signals Vg are applied so that normal image display can be achieved, and during the touch sensing period, the touch driving signals Vt are applied so that the capacitive load between the gate line GL and the sensing line SL can be minimized.

Figure 8:
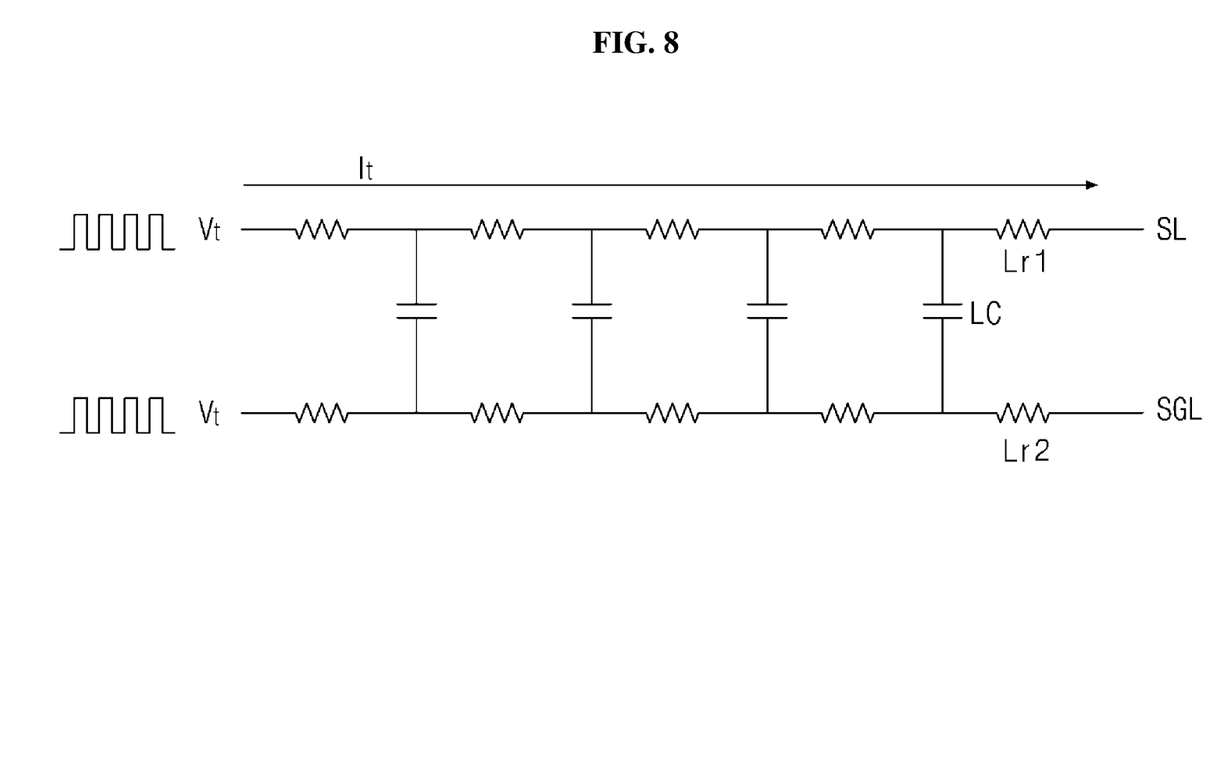
FIG. 8 is an RC equivalent circuit diagram of the LCD according to the first embodiment of the present invention.

FIG. 8 is an RC equivalent circuit diagram of the LCD according to the first embodiment of the present invention.

Referring to FIG. 8, during the touch sensing period, the signal line SGL, such as the gate line and the data line, which produces a coupling capacitance with the sensing line SL, is applied with the touch driving signal Vt equally to the sensing line SL. In other words, a signal having the same waveform as the touch driving signal Vt is applied to the signal line SGL.

Accordingly, during the touch sensing period, a voltage difference between both ends of a capacitive load Lc may not happen during a touch sensing period, thus an effect of removing the capacitive load Lc happens, and thus an inflow of the current It, which flows on the sensing line SL, into the capacitive load Lc can be minimized. Thus, an RC delay of the touch driving signal Vt by the capacitive load Lc can be minimized, and a touch performance can be maximized.

Actually, in comparison with the related art of not applying the touch driving signal to the signal line, the capacitive load of this embodiment is reduced by 75% or more.

Figure 9:
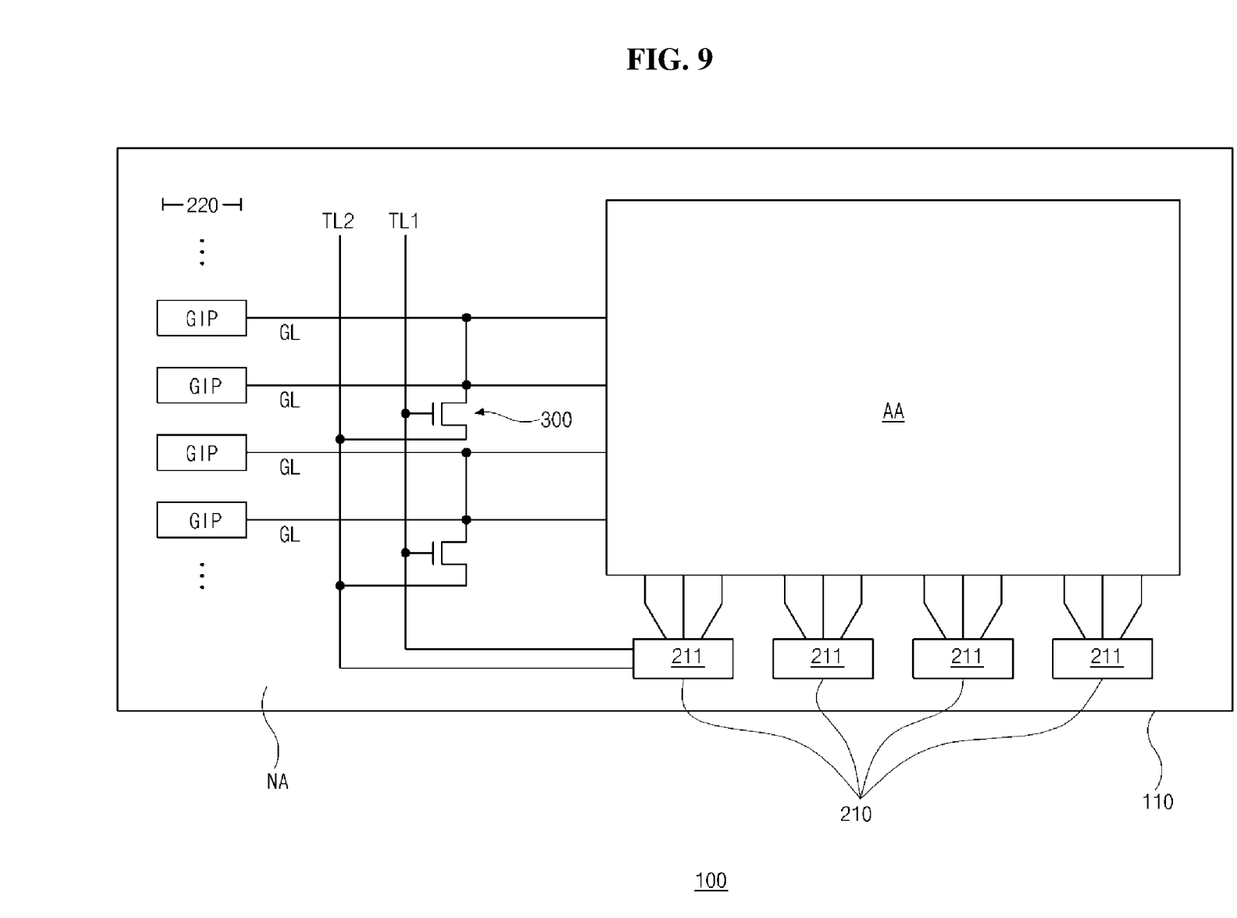
FIG. 9 is a view illustrating an LCD according to a second embodiment of the present invention.

FIG. 9 is a view illustrating an LCD according to a second embodiment of the present invention. The LCD 100 of the second embodiment is similar to that of the first embodiment except for a connection relation between the load reduction circuit 300 and the gate line GL. For the purpose of explanations, explanations of parts similar to parts of the first embodiment may be omitted.

Referring to FIG. 9, in the LCD 100 of the second embodiment, each load reduction circuit 300 may be connected to at least two neighboring gate lines GL, and in this embodiment is described an example that each load reduction circuit 300 is connected to two neighboring gate lines GL.

In the first embodiment, each load reduction circuit 300 is connected to each gate line GL, while in the second embodiment, each load reduction circuit 300 is connected to a unit group of two or more neighboring gate lines.

By increasing a number of gate lines connected to each load reduction circuit 300, a number of the load reduction circuits 300 configured in the liquid crystal panel 110 is reduced. Thus, a production cost of the load reduction circuits 300 can be reduced, and an availability of an area of the non-display region NA where the load reduction circuit 300 are arranged can increase.

In comparison with the first embodiment, a signal transferring path between the load reduction circuit 300 and the gate line GL in the second embodiment increases. Thus, the first embodiment has an advantage that a distortion of a touch driving signal transferred to the gate line can be minimized and a deviation of a touch driving signal according to a position of the gate line can be minimized.

Figure 10:
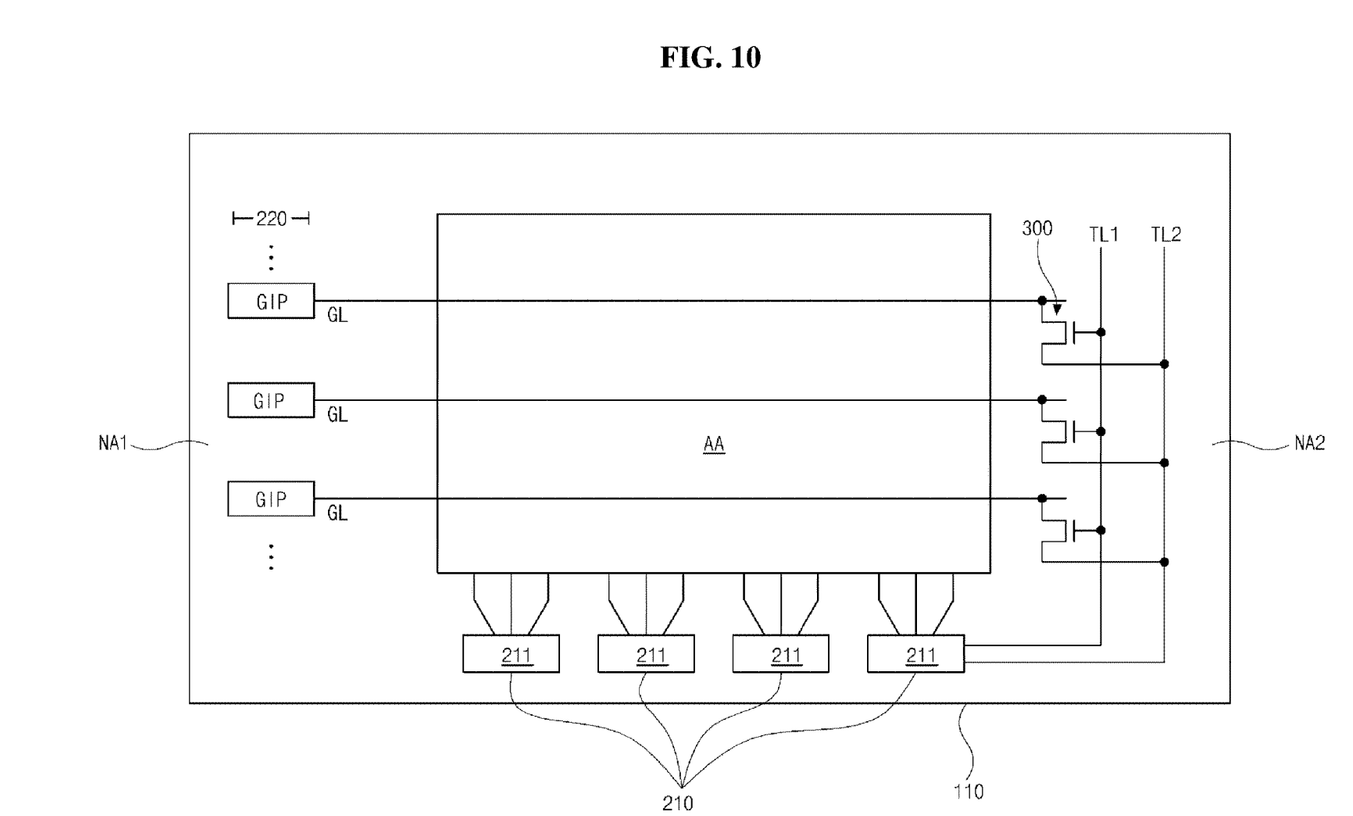
FIG. 10 is a view illustrating an LCD according to a third embodiment of the present invention.

FIG. 10 is a view illustrating an LCD according to a third embodiment of the present invention. The LCD 100 of the third embodiment is similar to that of the first embodiment except for a connection position between the load reduction circuit 300 and the gate line GL. For the purpose of explanations, explanations of parts similar to parts of the first embodiment may be omitted.

Referring to FIG. 10, in the LCD 100 of the third embodiment, the load reduction circuit 300 may not be connected to one end of the gate line GL located at a side of an output terminal of the GIP circuit GIP but may be connected to the other end of the gate line GL opposite to the one end of the gate line GL. In other words, the load reduction circuit 300 may be located at a non-display region NA2 opposite to a non-display region NA1 where the GIP circuit GIP is located with the display AA between the non-display regions NA1 and NA2, and be connected to the other end of the gate line GL.

In this case, an availability of an area of the non-display region NA1 where the GIP circuit is located can increase, and a width of this non-display region NA1 can be reduced.

Figure 11:
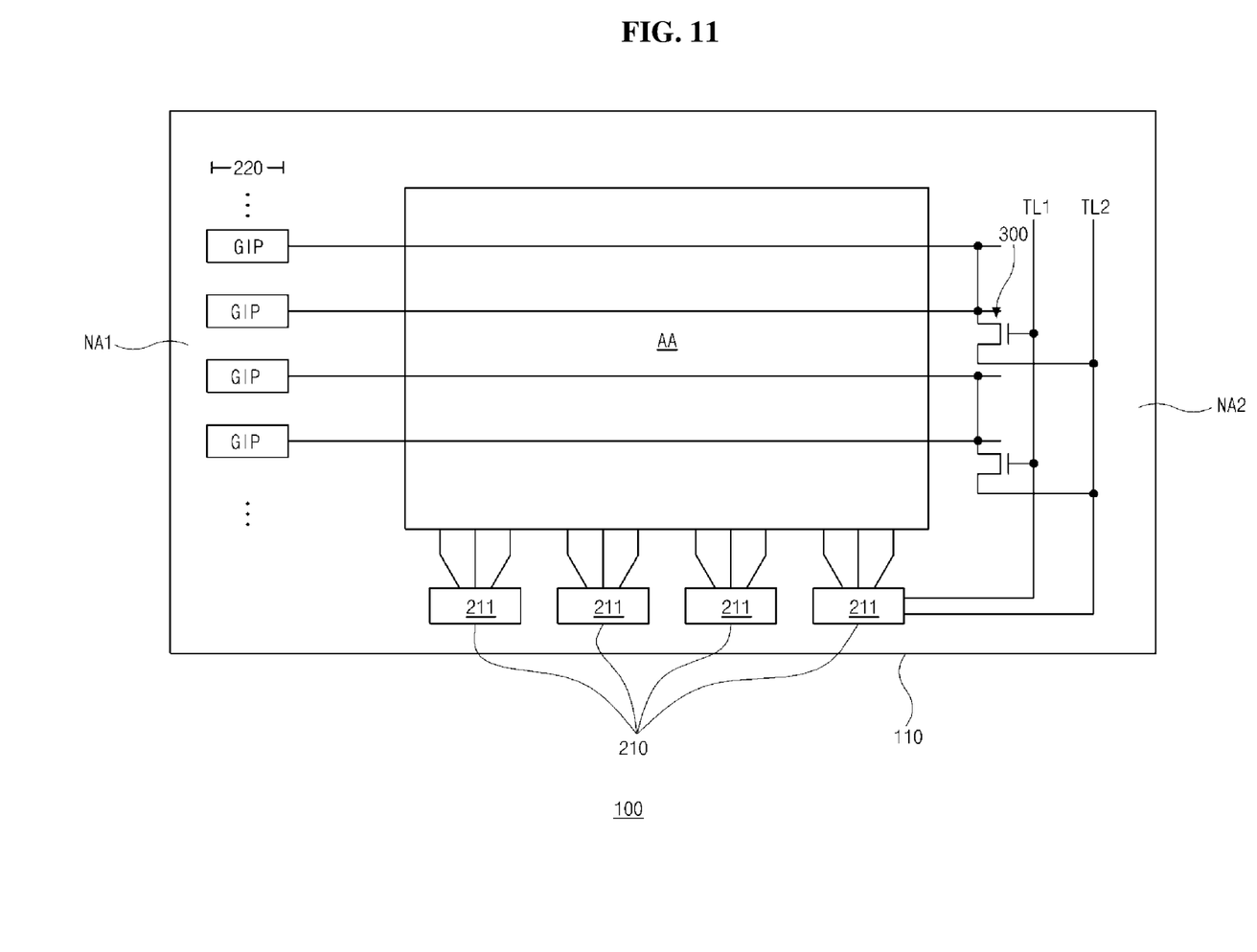
FIG. 11 is a view illustrating an LCD according to a fourth embodiment of the present invention.

FIG. 11 is a view illustrating an LCD according to a fourth embodiment of the present invention. The LCD 100 of the fourth embodiment is similar to that of the third embodiment except for a connection relation between the load reduction circuit 300 and the gate line GL. For the purpose of explanations, explanations of parts similar to parts of the third embodiment may be omitted.

Referring to FIG. 11, in the LCD 100 of the fourth embodiment, each load reduction circuit 300 may be connected to at least two neighboring gate lines GL, as similar to the second embodiment, and in this embodiment is described an example that each load reduction circuit 300 is connected to two neighboring gate lines GL.

According to the above-described embodiments, in the GIP-structure in-cell touch LCD, the load reduction circuit connected to the gate line is employed, and during the touch sensing period, the load reduction circuit is operated to output a signal, which is equal to the touch driving signal applied to the sensing line, to the corresponding gate line. According, the resistive load between the sensing line and the gate line is minimized, thus a distortion of the touch driving signal applied to the sensing line is minimized, and thus a touch performance can be improved.

Further, the touch driving signal is applied to the data line during the touch sensing period, and thus the resistive load between the sensing line and the data line is minimized. Therefore, a touch performance can be maximized.

It should be understood that the above embodiments can be applied to all sorts of display devices including an LCD.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-cell touch type display device, comprising: a touch electrode that is in a touch panel and arranged at each touch block;
   a sensing line that is connected to the touch electrode, and transfers a touch driving signal from a source driving circuit during a touch sensing period;
   a gate-in panel (GIP) circuit that is in an array substrate, and outputs a gate signal to a gate line crossing and overlapping the sensing line, during a display period; and
   a load reduction circuit that outputs the touch driving signal to the gate line during the touch sensing period;
   wherein a pixel electrode is in a pixel region of the array substrate and corresponds to the touch electrode, and wherein the touch electrode is supplied with a common voltage through the sensing line in the display period.

2. The device of claim 1, wherein each load reduction circuit is connected to each gate line.

3. The device of claim 1, wherein each load reduction circuit is connected to at least two neighboring gate lines.

4. The device of claim 1, wherein the load reduction circuit is connected to one of both opposite ends of the gate line between which a display region of the array substrate are located.

5. The device of claim 1, wherein the load reduction circuit includes a transistor, and
   wherein the device further comprises:
   a first transfer line that is connected to a gate terminal of the transistor, and transfers a switching signal which has an off state and an on state in the display period and the touch sensing period, respectively; and
   a second transfer line that is connected to a source terminal of the transistor, and transfers the touch driving signal in the touch sensing period.

6. The device of claim 1, wherein the source driving circuit is configured to output the touch driving signal to a data line in the touch sensing period.

7. The device of claim 1, wherein a pixel electrode is in a pixel region of the array substrate and corresponds to the touch electrode, and wherein the touch electrode is supplied with a common voltage through the sensing line in the display period.

8. The device of claim 1, wherein the touch driving signal has a pulse waveform.

9. The device of claim 1, wherein the gate line extends along a first direction, and the sensing line extends along a second direction crossing the first direction and is connected to an output terminal of the source driving circuit.

10. A driving IC of an in-cell touch type display device, comprising:
    an output terminal that outputs a touch driving signal to a sensing line, which is connected to a touch electrode arranged at each touch block, during a touch sensing period;
    an output terminal that outputs a switching signal, which has an off state and an on state during a display period and the touch sensing period, respectively, to a first transfer line connected to a gate terminal of a transistor, the transistor connected to a gate line crossing and overlapping the sensing line; and
    an output terminal that outputs the touch driving signal to a second transfer line connected to a source terminal of the transistor during the touch sensing period;
    wherein a pixel electrode is in a pixel region of an array substrate and corresponds to the touch electrode, and wherein the touch electrode is supplied with a common voltage through the sensing line in the display period.

11. The driving IC of claim 10, wherein the touch driving signal has a pulse waveform.

12. The device of claim 10, wherein the gate line extends along a first direction, and the sensing line extends along a second direction crossing the first direction and is connected to the output terminal that outputs the touch driving signal to the sensing line.

* * * * *